(12) United States Patent
Cillessen et al.

(10) Patent No.: US 6,524,214 B1
(45) Date of Patent: Feb. 25, 2003

(54) VARIABLE RATIO TRANSMISSION

(75) Inventors: James A. Cillessen, 11766 W. 53rd Pl., Arvada, CO (US) 80002; DeLon L. Uncapher, Parker, CO (US)

(73) Assignee: James A. Cillessen, Arvada, CO (US)

( * ) Notice: Subject to any disclaimer, the term of this patent is extended or adjusted under 35 U.S.C. 154(b) by 0 days.

(21) Appl. No.: 09/749,350

(22) Filed: Dec. 27, 2000

(51) Int. Cl.$^7$ ............................................... F16H 15/20
(52) U.S. Cl. ........................................ 476/55; 476/47
(58) Field of Search ............................. 74/348; 476/47, 476/55

(56) References Cited

U.S. PATENT DOCUMENTS

| | | | | |
|---|---|---|---|---|
| 861,069 A | * | 7/1907 | Wood | 476/18 |
| 1,302,821 A | * | 5/1919 | McNeel | 476/1 |
| 1,381,866 A | * | 6/1921 | Gherassimoff | 476/18 |
| 2,158,137 A | * | 5/1939 | McConnell | 235/103.5 R |
| 2,610,513 A | * | 9/1952 | Podell | 476/30 |
| 3,747,424 A | | 7/1973 | Alexeev | |
| 4,161,890 A | | 7/1979 | Goloff et al. | |
| 4,183,253 A | | 1/1980 | Borello | |
| 4,192,201 A | * | 3/1980 | McCoin | 475/215 |
| 5,525,119 A | | 6/1996 | Marques | |

FOREIGN PATENT DOCUMENTS

| | | |
|---|---|---|
| DE | 314 836 C | 11/1996 |
| FR | 2 218 005 A | 6/1974 |
| GB | 144 380 A | 10/1920 |

* cited by examiner

Primary Examiner—William C Joyce
(74) Attorney, Agent, or Firm—Rick Martin; Patent Law Offices of Rick Martin, P.C.

(57) ABSTRACT

A variable ratio transmission that varies output drive shaft speed by varying the position of the output shaft drive disk along a conical shaped input drive surface.

10 Claims, 6 Drawing Sheets

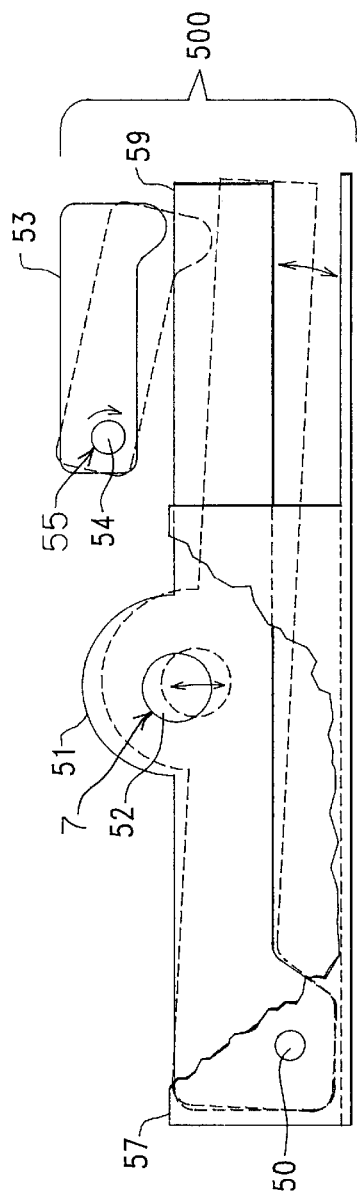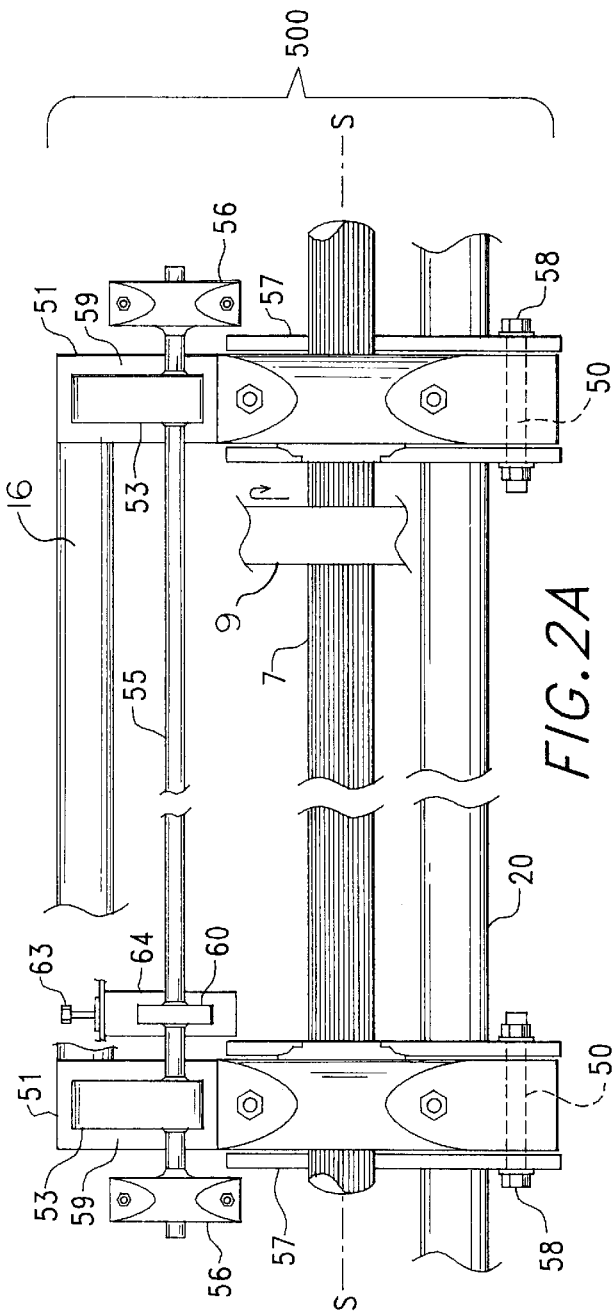
FIG.2
FIG.2A

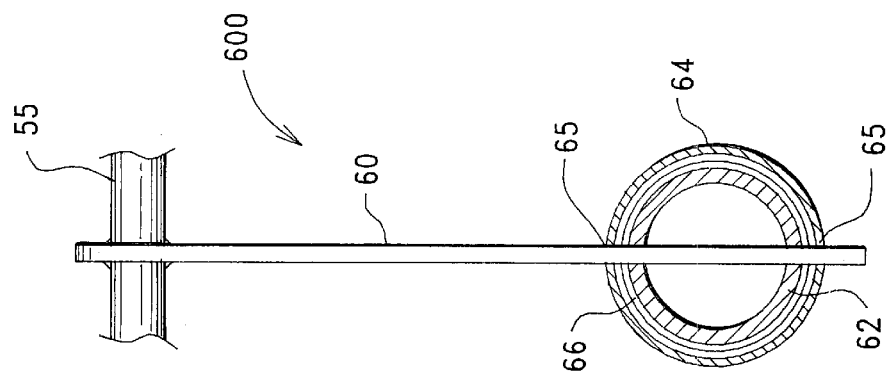
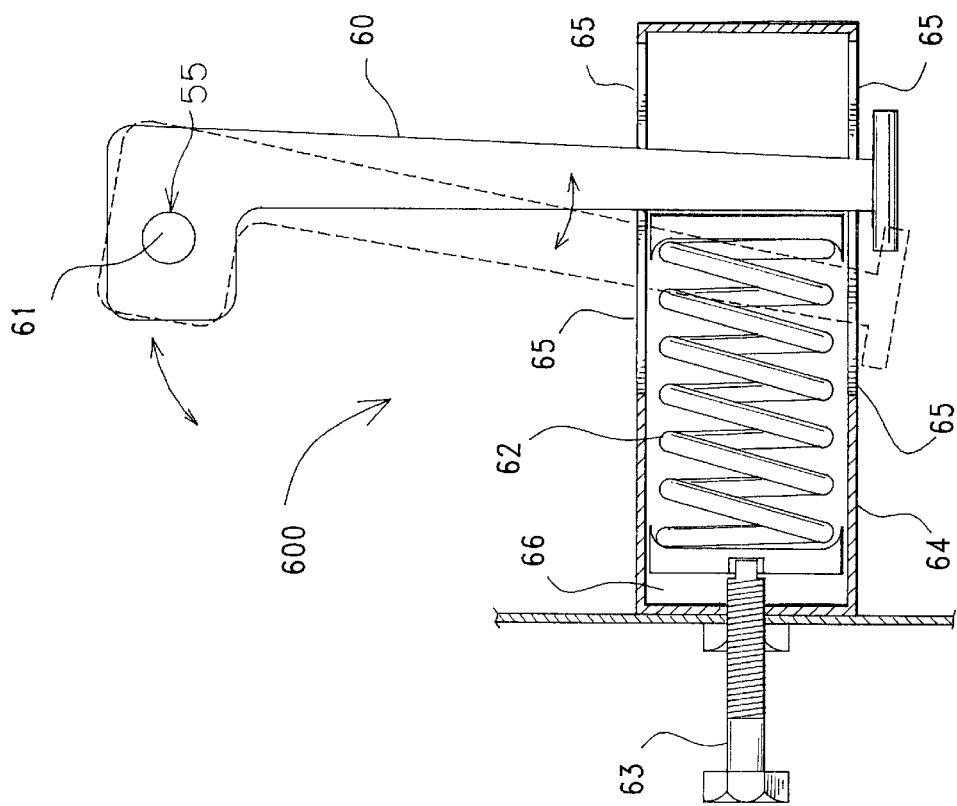

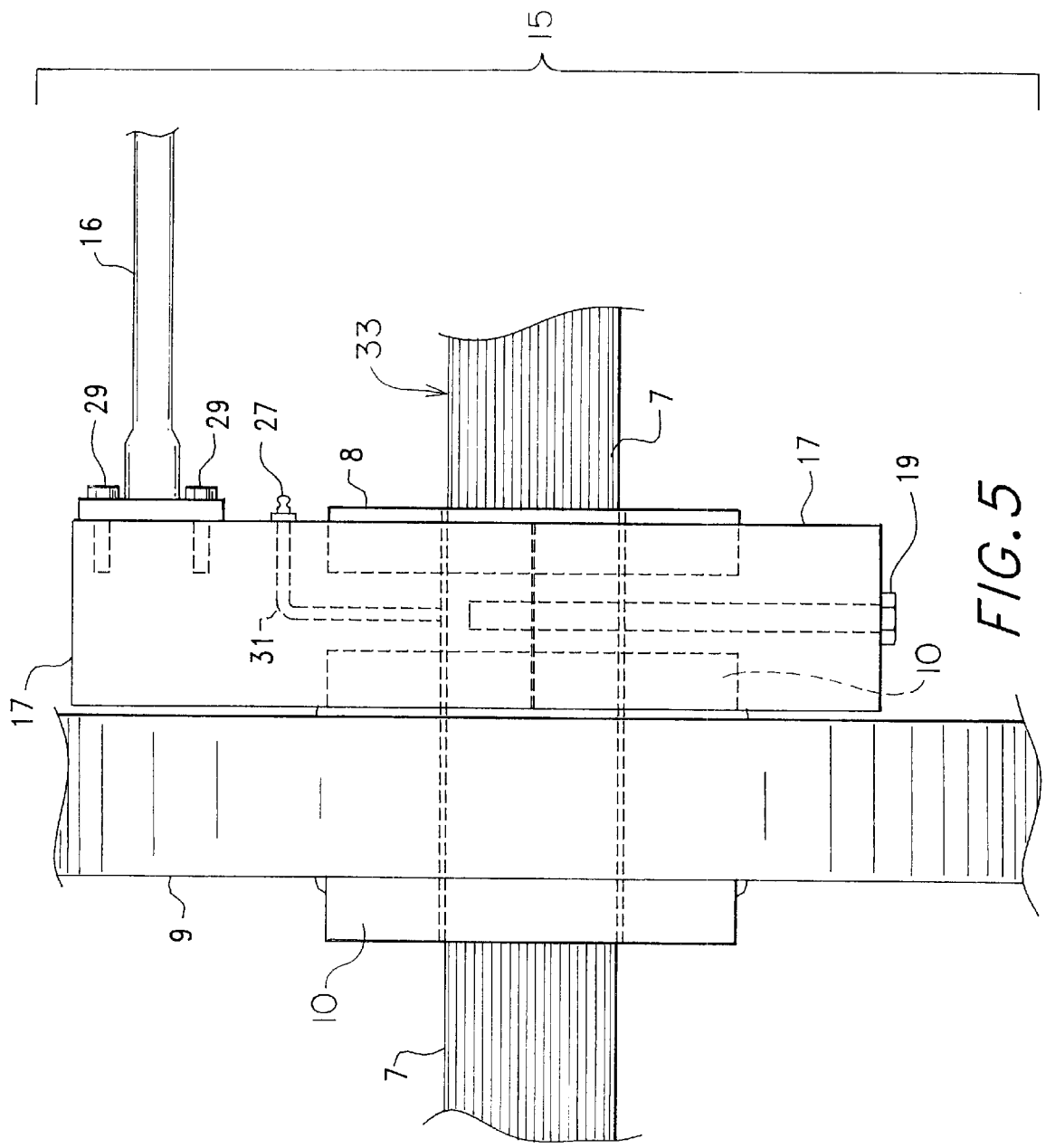

VARIABLE RATIO TRANSMISSION

FIELD OF THE INVENTION

The present invention relates to a disk member and cone member in direct contact with one another with variable relative positioning providing a transmission with a finitely and variable ratio of input to output speed.

BACKGROUND OF THE INVENTION

Gear ratios of vehicles are generally fixed to limited numbers of gears. These gears try to establish an ideal relationship between the input force of the motor and the speed of motion of the vehicle. Thus, at lower speeds, higher torque is applied to the driving axle while maximum speed is low; and at higher speed less torque is required but maximum speed is high. Maximum engine torque is usually constant while driving torque requirements vary greatly with speed and road topology. Ideally, a continuous gear shifting would optimize driving conditions. Today's standard automobile transmissions generally provide 3 to 5 gear ratios and are manufactured with many parts. Road topology, frequent shifting of gears, many parts within all tend to provide high maintenance and non-optimal driving performance.

U.S. Pat. No. 3,747,424 describes a speed reducing gear having a frustoconical body acting as the reducing mechanism driving a horizontal output shaft. A horizontally engaged input drive shaft (worm gear) can be moved along the gradiated surface of the frustoconical body to reduce the speed ratio between the input and output. The invention requires a 90 degree angle between the input and output shafts making it awkward for a transmission shaft. It also requires a worm type interface for force transfer because the contact area of input to output would be very slight without a worm interface. It is also designed as a speed reducer.

U.S. Pat. No. 5,525,119 discloses a mechanism for varying rotational speed between two rotary shafts. It employs an intermediate roller contacting two cones. Speed variation is employed by the position of the roller between the two oppositely mounted cones while the roller is under pressure against the surfaces of both cones.

U.S. Pat. No. 4,161,890 discloses an improvement to the contact surfaces in preventing slippage between two substantially inelastic members that are in frictional engagement.

U.S. Pat. No. 4,183,253 discloses a moveable power transfer wheel interconnecting a pair of dual cones. Movement of the transfer wheel between both sets of cones varies input/output speed ratio.

What is needed is a mechanism employing direct drive means while able to vary the input/output speed ratio with no intermediate contacting parts. What is also needed is a mechanism to have the transfer of power directly between an input and an output member.

The present invention resolves these problems. The present invention provides an ability to vary speed directly between two members while providing direct power transfer with no intermediate parts. The present invention also provides in-line drive. That is, the input shaft and output shaft can be maintained with their individual axis in a coplanar relationship. The present invention is also simple to manufacture with minimal parts. The present invention is also easily adjustable and maintainable.

SUMMARY OF THE INVENTION

The main aspect of the present invention is to provide a continuously variable speed (within set limits) between a driving shaft and a transmitting output shaft.

Another aspect of the present invention is to provide a means for input and output drive contacting surfaces to be in parallel for optimal power transfer.

Another aspect of the present invention is to provide contact between both the driving member and the transmitting member in a co-linear fashion. That is, both members have outer surfaces that are maintained in parallel.

Another aspect of the present invention is to provide a means of adjustment of the speeds. An axially moveable shaft coupled to the disk shaped member in a reciprocating fashion accomplishes this. Movement of the disk shaped member surface to various parts of the cone surface changes the speed ratio.

Another aspect of the present invention is to provide a means for insuring constant pressure between the surface of the disk member and the cone member during operation. Constant pressure and high frictional coefficients prevent slippage during operation.

Another aspect of the present invention is to provide a high coefficient of friction between the disk member and cone member when in operation.

Another aspect of the present invention is to provide a means of having the input and output drives along the same plane for ease of assembly in using applications such as automobiles for example.

Another aspect of the present invention is ease of manufacture via fewer parts than a standard transmission.

Another aspect of the present invention is improved reliability and life via fewer parts and fewer wear surfaces than a standard transmission.

Another aspect of the present invention is ease of maintainability.

Variable speed is accomplished by moving a disk shaped member along a conical shaped member. In this description of the present invention the cone will be referenced as the input driving-member and the disk as the output-driving member. The input driving member, or cone, is connected to a shaft that is driven by a motor input such as an automobile engine. Both members are directly connected to input and output-drive shafts respectively and rotate along the axis of each shaft. Both members are in direct pressure contact with each other with no intermediate parts; thus power is transferred directly between the disk and cone members. The outer edge surface of the disk is parallel with the outer edge surface of the cone. A 1:1 speed ratio, for example, can be maintained when the output disk member circumference is at the large end of the input cone member with matching circumference. With the output drive shaft connected to the disk member and the input shaft connected to the cone member, the ratio would be 1:1. If the disk were moved to the smaller circumference (1/10$^{th}$ circumference of disk for example) end of the drive cone the ratio would be 10:1. More torque would be transmitted at the lower ratio. Selection of ratios would be a design requirement dependent and changeable via maximum and minimum circumferences of the cone.

Movement of a positioner shaft connected to the disk member accomplishes variable output speed changes. This movement adjusts the surface contact point between the disk member and the cone member. This provides a different surface contact point between the disk shaped member and the cone shaped member. The different surface contact point of the disk outer surface onto the cone outer surface is related to a different outside circumference of the cone member and thus a different drive ratio. The outside edge surface of the disk member is parallel to the outside longitudinal edge surface of the cone member. Movement and retention of position could be accomplished, for example, by an electrically driven screw shaft or by a hydraulic system to provide infinitesimal adjustment while also providing direct lateral holding power.

Constant pressure between the disk member and the cone member contact points can be maintained with various design methods. Shown herein is a method using a system with a pivot point hinge that places a downward pressure on the output shaft by means of a lever arm, adjustable spring and cams. Pressure over the range of movement of the contact surface points between the disk and cone members is thus both constant and can be easily adjusted based on design requirements.

A high coefficient of friction can be maintained between the outer surface of the cone member and the outer surface of the disk member with modern materials that provide a high frictional coefficient while exhibiting relatively little wear. The working cone member is presently flame sprayed with stainless steel onto the steel base. Other materials such as specially developed ceramics, kevlar, carbide impregnated materials etc. also may be desirable depending on the application. Disk member outside edge thickness design variation also provides a design means of increasing or decreasing contact surfaces between the disk and cone member surfaces.

While the output and positioner adjustment shafts are parallel, all shafts (input, output and positioner) are all co-planar. This is accomplished by a housing design with bearings, clamps and framework holding all shafts within the same co-plane. This lends itself to ease of assembly and application.

Other aspects of this invention will appear from the following description and appended claims, reference being made to the accompanying drawings forming a part of this specification wherein like reference characters designate corresponding parts in the several views.

BRIEF DESCRIPTION OF THE DRAWINGS

FIG. 2 is a side view of the pressure plate assembly 500.

FIG. 2A is a top view of the pressure plate assembly 500 connected to the output shaft 7.

FIG. 2B is side view of the pressure adjustment assembly 600.

FIG. 2C is a frontal view of pressure adjustment assembly 600.

FIG. 5 is a side view of output roller drive disk 9 and output drive shaft 7 connected to ratio positioner plate 17 and ratio positioner adjustment shaft 16.

Before explaining the disclosed embodiment of the present invention in detail, it is to be understood that the invention is not limited in its application to the details of the particular arrangement shown, since the invention is capable of other embodiments. Also, the terminology used herein is for the purpose of description and not of limitation.

DETAILED DESCRIPTION OF DRAWINGS

The preferred embodiment of the variable ratio transmission 1000 is made up of two basic assemblies. The lower section is the Input Drive Shaft Assembly 3000. The upper section is the Output Drive Shaft Assembly 2000.

Figure 1:
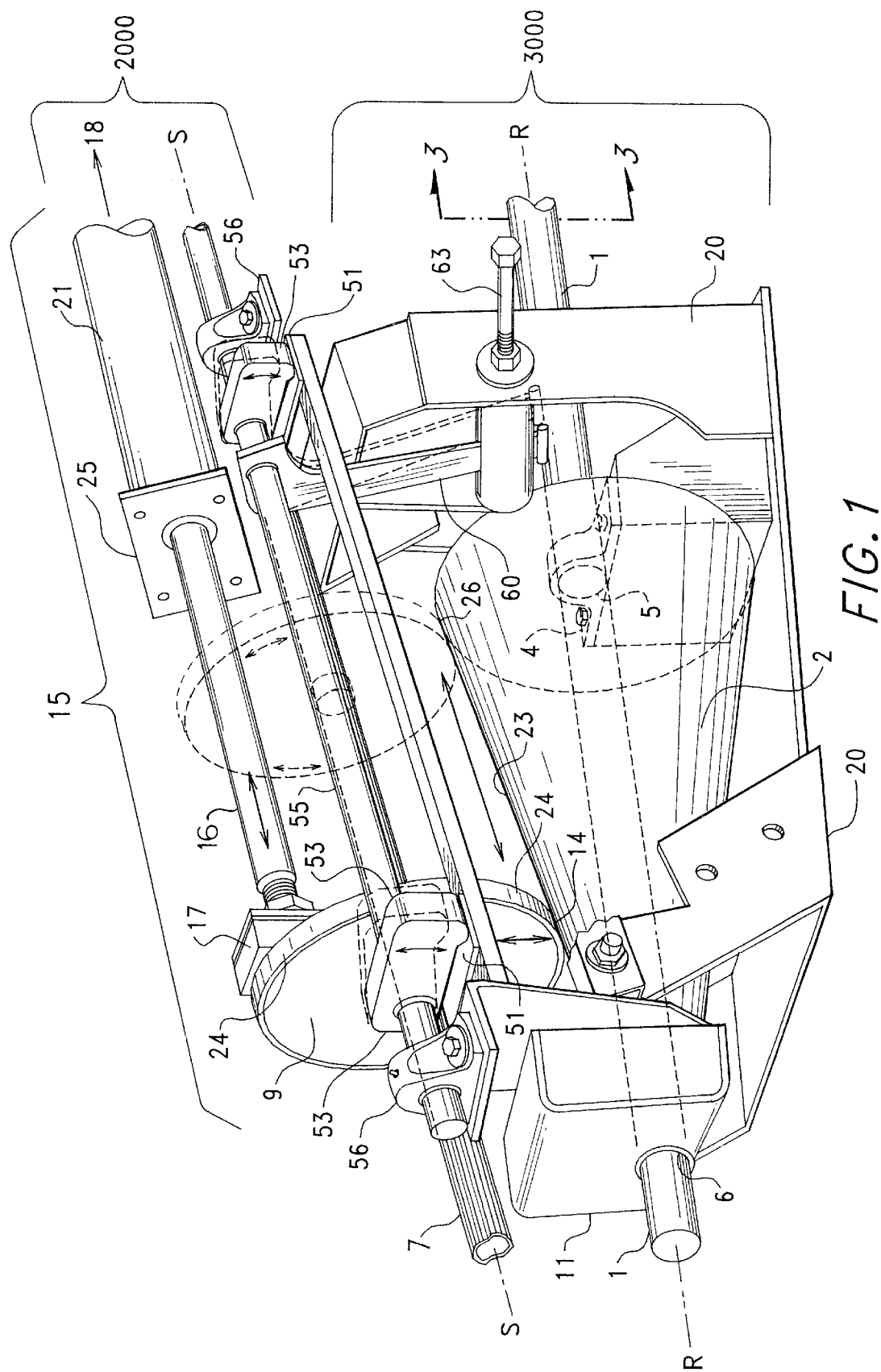
FIG. 1 is a frontal corner perspective view of the variable ratio transmission 1000.
Figure 4:
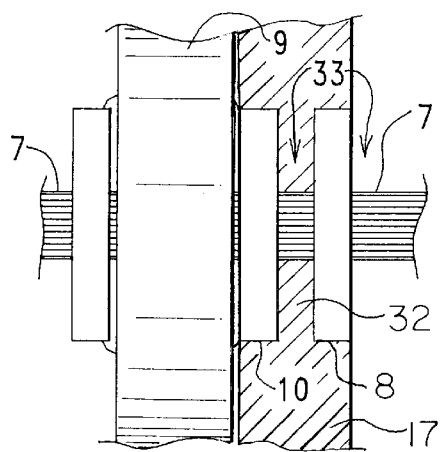
FIG. 4 is a side view of output roller drive 9 and output drive shaft 7.

The Input Drive Shaft Assembly (driving member) 3000 as seen in FIG. 1 consists of an Input Drive Shaft (driving shaft) 1 that is driven directly from a motor drive supply 3 power input (detail not shown). Input drive shaft 1 rotates about longitudinal drive axis R—R as seen in FIG. 1. The power input could be, for example, an automobile motor. A conical drive member (driving cone) 2 is rigidly connected to input drive shaft 1. Input drive shaft 1 is physically connected to base mount (frame) 20 bearing clamps at either end by input drive shaft clamp-A 4 and input drive shaft bearing-A 5 at one end. The other end of input drive shaft 1 is clamped to base mount 20 by input drive shaft retainer-B 11 and with input drive shaft bearing-B 6. In this position, conical drive member 2 is power driven directly by a motor drive supply 3. Conical drive member 2 is a tapering body along outer edge surface (tapered drive surface) 23.

The output drive shaft assembly (driven member) 2000 is seen in FIG. 1. The main components of output drive shaft assembly 2000 are the output drive shaft (transmission shaft) 7, the output roller drive disk 9, the adjustable pressure assembly (adjustable compression force assembly) 500 (seen detailed in FIGS. 2, 2A) and the ratio positioner assembly 15. The output drive shaft 7 as seen in FIGS. 1, 2A, 4, 5 is connected to base mount 20 at the two pressure plate-to-base frame pivot points 50. Output drive shaft 7 rotates about longitudinal axis (transmission axis) S—S as seen in FIG. 1. Output roller drive disk 9 is internally grooved and mounted to output drive shaft 7 which is a spline shaft. Contact between output roller drive disk 9 and conical drive member 2 create the output drive force. Adjustable pressure assembly 500 maintains downward pressure (compression) between output roller drive 9 and conical drive member 2.

FIG. 2A shows adjustable pressure assembly 500. Each of the two pressure plate lever arms 51 are connected to the base mount 20 at pressure plate-to-base frame pivot points (pivot mounts or hinge points) 50. Each pressure plate lever arm 51 pivots about pressure-to-base frame pivot points 50 within pressure plate frame seating beds 57. Each pressure plate lever arm 51 contain output shaft bearing holes 52 for acceptance of output drive shaft 7. The other end of each pressure plate lever arm top surface 59 is in contact with the surface of cams (cam lever arms) 53. Pressure rod 55 is rigidly connected to each cam 53. Pressure rod (connecting rod) 55 is also connected to base mount 20 at either end via two base frame-to-pressure rod brackets 56. Pressure rod 55 is allowed to swivel within each of base frame-to-pressure rod brackets 56.

FIG. 2B, 2C show pressure adjustment assembly 600. Rotational movement of the cams 53 is achieved by rotation of pressure adjustment bolt 63. As pressure bolt 63 moves against pressure adjustment spring plate 66, pressure adjustment spring 62 is compressed or decompressed accordingly. Thus when pressure adjustment bolt 63 is rotated, pressure adjustment spring 62 applies more or less force against pressure adjustment lever arm (lever bar) 60. Pressure adjustment lever arm 60 is rigidly connected to pressure rod 55 at pressure adjustment lever arm to pressure rod contact point 61. Movement of pressure adjustment lever arms 60 causes rotation of pressure rod 55 and thus each cam 53 rotates. This rotation applies more or less pressure to each of pressure plate lever arms 51 at each pressure plate lever arm top surface 59. As pressure plate lever arms 51 are bearing connected to output drive shaft 7, more or less pressure is thus transferred between the interface of output roller drive disk 9 (rigidly affixed to output drive shaft 7) and conical drive member 2. This means of pressure adjustment assures that output roller drive outer edge surface (peripheral contact surface) 24 and conical member outer edge surface 23 are in positive pressure contact and that the pressure is adjustable.

When input drive shaft assembly 3000 is assembled to output drive shaft assembly 2000 the conical member outer edge surface 23 is in contact with and is directly parallel with output roller drive outer edge surface 24. In this position, powered rotation of conical member 2 causes direct rotation of output roller drive 9. In turn, rotation of output roller drive 9 rotates output drive shaft 7.

It should be noted that other means of maintaining pressure between output roller drive outer edge surface 24 and conical member outer edge surface 23 may be employed by various design configurations.

Speed changes to output drive shaft 7 are controlled by adjusting the position of output roller drive 9 along conical member outer edge surface 23. Movement of ratio positioner assembly (disk positioner) 15 as seen in FIG. 1, 5 accomplishes this position adjustment. Movement of ratio positioner adjustment shaft 16 in a reciprocating manner moves ratio positioner plate (end plate) 17 accordingly. Ratio positioner shaft adjustment input drive member 18 supplies power for movement and retention to ratio positioner plate 17. Ratio positioner drive shaft retainer encasement 21 is connected to base mount 20 with ratio positioner to frame retention plate 25. Power from ratio positioner shaft adjustment input drive member 18, for example, can be supplied by an electrically driven screw shaft or by hydraulics for both positioning and retention.

Figure 3A:
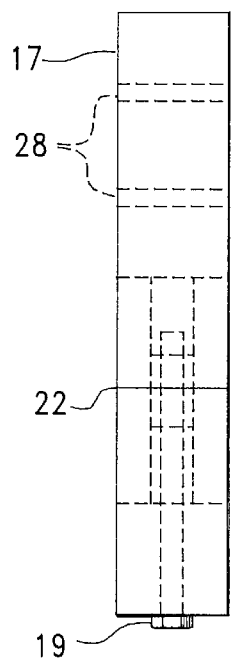
FIG. 3A is a side view of ratio positioner plate 17.
Figure 3:
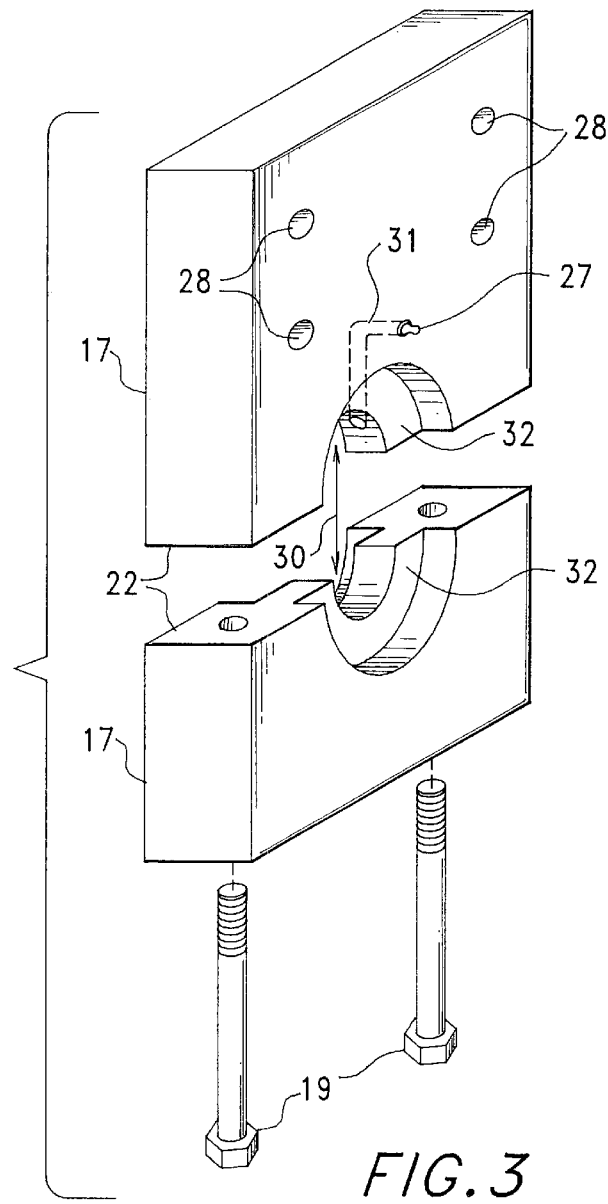
FIG. 3 is a frontal perspective view of ratio positioner plate 17.

FIGS. 3, 3A illustrate ratio positioner plate 17. Ratio positioner plate 17 has four ratio positioner plate retention holes 28 for mounting ratio positioner to frame retention plate 25; and two ratio positioner shaft plate retention bolts 19 to hold the two parts of ratio positioner plate 17 together at joining surfaces of ratio positioner plate 22. Ratio positioner plate 17 has a ratio positioner plate grease fitting 27 which lubricates ratio positioner plate retention cavity 30 surfaces by supplying lubrication through channel 31. Ratio positioner plate 17 also has retention interlock sleeve 32 that assembles between output roller drive outer retention sleeve 8 and output roller drive inner retention sleeve 10. Retention interlock sleeve 32 assembles into output roller retention cavity 33. When ratio postioner plate 17 is assembled onto output roller drive 9, retention interlock sleeve 32 fitting into output roller retention cavity 33 provides the means of movement of output roller drive 9 along conical member outer edge surface 23.

Speed ratios are accomplished by moving output roller drive 9 along conical member outer edge surface 23. It should be noted that other means of positioning could be incorporated.

The variable ratio transmission can be designed at various ratios. As an example, if output roller drive 9 is moved to the large circumference conical member edge 26 and the circumferences of both are the same, then the ratio would be 1:1 and the output shaft 7 would rotate at the same speed as the input drive shaft 1. In automobiles, this may be a "high" gear. When output roller drive 9 is moved to the small circumference conical member edge 14, the circumference of the conical drive member 2 is smaller than the circumference of output roller drive 9. In this position, the output ratio may be 10:1 for example. This would be similar to a "low" gear. At the "low" gear point, more drive torque is supplied to output drive shaft 7.

The ability to move output roller drive 9 along conical member outer surface 23 in infinitesimal increments provide a true variable ratio transmission. There are a minimal amount of parts for ease of maintenance and high reliability.

Figure 6:
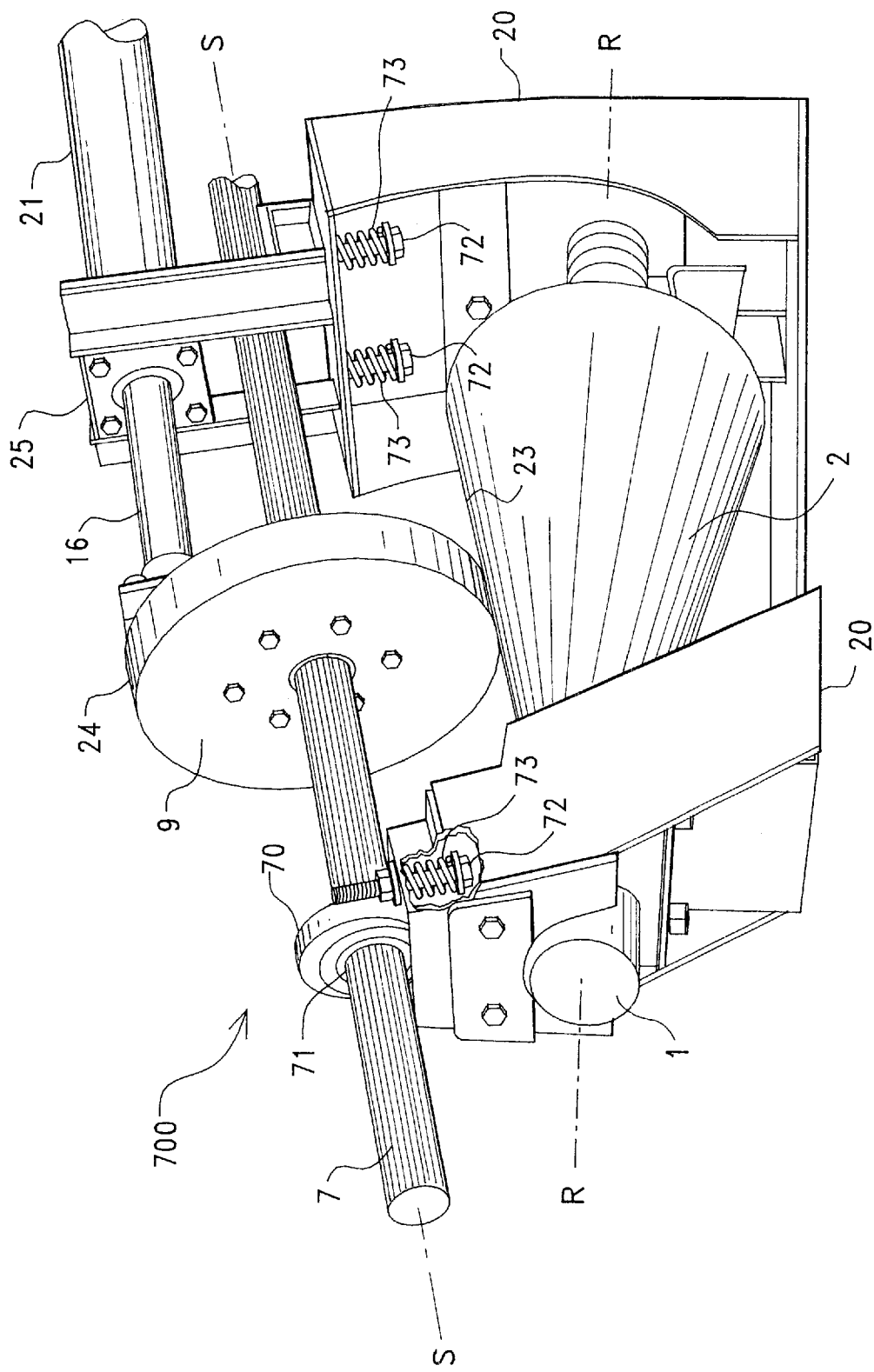
FIG. 6 is a frontal corner perspective view of alternate embodiment of variable ratio transmission 700.

Alternate embodiment of the variable ratio transmission 700 is shown in FIG. 6. This specific alternate embodiment employs a different method of applying compression between output roller drive disk 9 and conical driver member 2. Conical member outer edge surface 23 and output roller drive outer edge surface 24 are held in compression by output drive shaft compression bolts 72 and output drive shaft compression springs 73. The amount of pressure (compression) exerted is adjustable by manual rotation of each output drive shaft compression bolt 72. In this embodiment, output drive shaft 7 is connected to the base mount 20 by output drive shaft clamp 70 and output drive shaft bearing 71 at each end.

GLOSSARY

1000—Variable Ratio Transmission
3000—Input Drive Shaft Assembly
1—Input drive shaft
2—Conical drive member
3—Motor drive supply
4—Input drive shaft clamp A
5—Input drive shaft bearing A
6—Input drive shaft bearing B
11—Input drive shaft retainer-B
20—Base mount
23—Conical member outer edge surface
26—Large circumference conical member edge
14—Small circumference conical member edge
2000—Output drive shaft assembly
7—Output drive shaft
8—Output roller drive outer retention sleeve
9—Output roller drive disk
10—Output roller drive inner retention sleeve
15—Ratio positioner assembly
16—Ratio positioner adjustment shaft
17—Ratio positioner plate
18—Ratio positioner adjustment input drive member
19—Ratio positioner shaft plate retention bolts
21—Ratio position drive shaft retainer encasement
22—Joining surfaces of ratio positioner plate
24—Output roller drive outer edge surface
25—Ratio positioner to frame retention plate
27—Ratio positioner plate grease fitting
28—Ratio positioner plate retention holes
29—Ratio positioner plate retention bolts
30—Ratio positioner plate retention cavity surfaces
31—Lubrication channel
32—Retention interlock sleeve
33—Output roller retention cavity
500—Adjustable Pressure Assembly
50—Pressure Plate-to-Base Frame Pivot Point
51—Pressure Plate Lever Arm
52—Bearing Hole to connect Output Shaft
53—Pressure Cam
54—Pressure Cam to Pressure Rod connection point
55—Pressure Rod
56—Base Frame to Pressure Rod Bracket
57—Pressure plate frame seating bed
58—Pressure plate-to-base retaining bolt 59—Pressure plate lever arm top surface
600—Pressure Adjustment Assembly
60—Pressure Adjustment Lever Arm
61—Pressure Adjustment Lever Arm to Pressure Rod contact point
62—Pressure Adjustment Spring
63—Pressure Adjustment Bolt
64—Pressure Adjustment Casing
65—Pressure Adjustment Casing Lever Arm Slot
66—Pressure Adjustment Spring Plate
700—Alternate embodiment of variable ratio transmission
70—Output drive shaft clamp
71—Output drive shaft bearing
72—Output drive shaft compression bolt
73—Output drive shaft compression spring Although the present invention has been described with reference to preferred embodiments, numerous modifications and variations can be made and still the result will come within the scope of the invention. No limitation with respect to the specific embodiments disclosed herein is intended or should be inferred.

What is claimed is:

1. A transmission for a continuous variation of the rotational speed between a driving member and a driven member, said transmission comprising:
   a driving member;
   a rotatable driving shaft mounted to the driving member and having an axial direction;
   a driving cone engaged and axially aligned with the driving shaft, the driving cone being truncated and having a surface with a tapering direction;
   an output drive shaft assembly having an output shaft with an axial direction co-planar and parallel with surface which has the tapering direction;
   said output drive shaft assembly further comprising an output roller drive disk;
   said output roller drive disk having a peripheral surface frictionally engagable with the surface which has the tapering direction;
   said output drive shaft assembly further comprising a ratio positioner functioning to position the output roller drive disk at a desired location along the surface which has the tapering direction; thereby providing a variable ratio output to the output drive shaft;
   wherein the ratio positioner further comprises a positioner adjustment shaft having a drive member and a connection to the roller drive disk;
   wherein the output drive shaft assembly further comprises an adjustable compression force assembly; and
   wherein the adjustable compression force assembly further comprises a pivot mount for the output drive shaft, and a pressure rod and cam lever functioning to pivot output drive shaft to a desired compression force between the surface which has the tapering direction and the output roller drive disk.

2. The transmission of claim 1, wherein the positioner adjustment shaft further comprises an end plate having a connection to a retention sleeve which attaches to the output drive shaft.

3. The transmission of claim 1, wherein the surface which has a tapering direction has a parallel engagement surface segment which engages the output roller drive disk along its outer edge surface in a parallel manner.

4. The transmission of claim 3, wherein the outer edge surface has a high coefficient of friction.

5. The transmission of claim 4, wherein the surface which has a tapering direction further comprises a high coefficient of friction.

6. The transmission of claim 1, wherein the output drive shaft assembly further comprises an adjustable compression force assembly.

7. A variable speed mechanism comprising:
   an input drive shaft having a conical outer surface an output shaft aligned parallel to an outside longitudinal edge of the drive shaft conical outer surface;
   a disk mounted on the output shaft and having an outer surface in contact with the conical outer surface of the drive shaft;
   a positioner connected to the disk functioning to move the disk along the conical outer surface of the drive shaft;
   a device to maintain a pressure between the input drive shaft conical outer surface and the disk;
   an adjustable pressure assembly to adjust the pressure between the input drive shaft conical surface and the disk;
   wherein the device to maintain a pressure between the input shaft conical outer surface and the disk further comprises a pivotable chassis which houses the output drive shaft, said pivotable chassis having the adjustable pressure assembly therein, said pivotable chassis having a cam lever arm means to move the output shaft toward the input drive shaft.

8. The mechanism of claim 7, wherein the positioner further comprises a powered shaft.

9. The mechanism of claim 7, wherein the input drive shaft conical outer surface further comprises a high coefficient of friction.

10. A variable speed transmission comprising:
    a frame
    a tapering body centered on an axis, said tapering body being journaled on said frame for rotation about said axis;
    said tapering body having a tapered drive surface;
    a disk with an axis parallel to said tapered drive surface and having a peripheral contact surface engaged parallel to said tapered drive surface;
    an output drive shaft engaged to said disk along said axis parallel to said tapered drive surface; and
    a disk positioner to move said disk at desired positions along said tapered drive surface, thereby providing a continuously variable output drive ratio from said tapering body to said output drive shaft;
    wherein said output drive shaft further comprises a variable pressure mechanism to vary a pressure between said disk peripheral contact surface and said tapered drive surface;
    wherein the variable pressure mechanism further comprises a movable output drive shaft pivotally mounted to a set of cam lever arms and a connecting rod mounted to a frame and having a lever bar which adjusts a position of the output drive shaft, thereby forcing more or less pressure of the disk against the tapering body.

* * * * *